US008459747B2

(12) United States Patent
Watanabe

(10) Patent No.: US 8,459,747 B2
(45) Date of Patent: Jun. 11, 2013

(54) VEHICLE SEAT

(75) Inventor: Masato Watanabe, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 200 days.

(21) Appl. No.: 13/031,927

(22) Filed: Feb. 22, 2011

(65) Prior Publication Data

US 2011/0210592 A1   Sep. 1, 2011

(30) Foreign Application Priority Data

Feb. 26, 2010 (JP) ................................. 2010-041645

(51) Int. Cl.
A47C 7/02 (2006.01)

(52) U.S. Cl.
USPC .................. 297/452.2; 297/452.18

(58) Field of Classification Search
USPC .......................................... 297/452.2, 452.18
See application file for complete search history.

(56) References Cited

U.S. PATENT DOCUMENTS

| 5,246,271 | A | * | 9/1993 | Boisset | 297/452.2 X |
| 5,253,924 | A | * | 10/1993 | Glance | 297/452.1 |
| 5,318,341 | A | * | 6/1994 | Griswold et al. | 297/452.18 X |
| 5,362,132 | A | * | 11/1994 | Griswold et al. | 297/452.2 X |
| 5,390,982 | A | * | 2/1995 | Johnson et al. | 297/410 |
| 5,447,360 | A | * | 9/1995 | Hewko et al. | 297/452.18 |
| 5,452,941 | A | * | 9/1995 | Halse et al. | 297/452.2 X |
| 5,509,716 | A | * | 4/1996 | Kolena et al. | 297/452.18 X |
| 5,564,785 | A | * | 10/1996 | Schultz et al. | 297/452.2 |
| 5,658,048 | A | * | 8/1997 | Nemoto | 297/410 |
| 5,690,386 | A | * | 11/1997 | Chabanne | 297/452.2 X |
| 5,697,670 | A | * | 12/1997 | Husted et al. | 297/452.18 X |
| 5,823,627 | A | * | 10/1998 | Viano et al. | 297/483 X |
| 6,045,186 | A | * | 4/2000 | Butt et al. | 297/452.18 X |
| 6,082,823 | A | * | 7/2000 | Aumont et al. | 297/452.2 |
| 6,241,318 | B1 | * | 6/2001 | Amano | 297/452.2 |
| 6,322,148 | B1 | * | 11/2001 | Kolena et al. | 297/452.2 |
| 6,767,055 | B1 | * | 7/2004 | Sparks | 297/216.14 |
| 6,767,067 | B2 | * | 7/2004 | Fourrey et al. | 297/452.2 X |
| 6,817,672 | B2 | * | 11/2004 | Matsunuma | 297/452.18 |
| 6,869,145 | B2 | * | 3/2005 | Matsunuma | 297/452.18 |
| 6,969,113 | B2 | * | 11/2005 | Krawchuk | 297/452.2 X |
| 7,093,901 | B2 | * | 8/2006 | Yamada | 297/452.2 X |
| 7,201,447 | B2 | * | 4/2007 | Yamada | 297/452.2 X |
| 7,261,373 | B2 | * | 8/2007 | Tanaka et al. | 297/483 X |
| 7,510,245 | B2 | * | 3/2009 | Okazaki et al. | 297/483 |

(Continued)

FOREIGN PATENT DOCUMENTS

JP      2002-059770 A      2/2002

Primary Examiner — Rodney B White
(74) Attorney, Agent, or Firm — Drinker Biddle & Reath LLP

(57) ABSTRACT

A seat belt-integrated vehicle seat is provided with an improved seat frame rigidity, without a size precision decrease of the entire seat frame. The vehicle seat with a seat belt includes a seat back frame having at least a pair of side frames, and an upper frame for coupling a pair of the side frames on the upper side, a shoulder anchor portion provided in an upper part of the side frame, the shoulder anchor portion into which a shoulder belt portion of the seat belt is inserted, and a reclining device provided in a lower part of the side frame, in which the side frame has a closed section structure portion having a hollow closed section, and an extension portion integrally formed by downwardly extending a surface of the closed section structure portion and positioned on the outer side, and the reclining device is attached to the extension portion.

10 Claims, 10 Drawing Sheets

U.S. PATENT DOCUMENTS

| | | | | |
|---|---|---|---|---|
| 7,677,669 B2 * | 3/2010 | Blankart | ................ | 297/452.2 X |
| 7,887,139 B2 * | 2/2011 | Yamada et al. | ........ | 297/452.2 X |
| 8,132,862 B2 * | 3/2012 | Yamada et al. | ............ | 297/452.2 |
| 8,267,479 B2 * | 9/2012 | Yamada et al. | ........ | 297/452.2 X |
| 2009/0108662 A1 * | 4/2009 | Becker et al. | .............. | 297/452.2 |
| 2010/0187887 A1 * | 7/2010 | Yamada et al. | ........ | 297/452.2 X |

* cited by examiner

VEHICLE SEAT

CROSS-REFERENCE TO RELATED APPLICATIONS

This application claims the foreign priority benefit of Japanese patent application no. JP2010-041645, filed Feb. 26, 2010. The contents of this application is herein incorporated by reference.

BACKGROUND

The invention relates to a vehicle seat, particularly to a seat belt-integrated vehicle seat provided with a reclining device, the vehicle seat to which a seat belt is attached.

Conventionally, there is a known vehicle seat provided with a reclining device and a seat belt which is supported on the vehicle seat at three points and integrated with the vehicle seat. In the seat belt-integrated vehicle seat, a shoulder anchor is provided in an upper part of a side frame on the outer side of a vehicle body (that is, the vehicle door side), and a shoulder belt portion of the seat belt is attached to the upper part of the side frame on the outer side via the shoulder anchor.

In such a seat belt-integrated vehicle seat, particularly at a time of a vehicle collision, a large load from a passenger is applied onto the seat belt. Thus, a large load is imposed onto the side frame on the outer side to which the shoulder belt portion is attached. Therefore, there is a known vehicle seat in which a side frame on the outer side is formed by a support having a square closed section structure to have a higher strength than a side frame on the inner side (for example, refer to Japanese Patent Application Publication No. 2002-059770 ("the '770 Publication")).

The vehicle seat described in the '770 Publication is provided with a reclining device in which a main side recliner of the reclining device is rotatably coupled to a lower arm and an upper arm, the lower arm is screwed and fixed only to a side plate of a main side cushion side frame by a first stepped bolt, and the upper arm is screwed and fixed only to a side plate of a main side back side frame by a second stepped bolt, so that the main side recliner is attached to the main side cushion side frame and the main side back side frame with a high precision.

However, in the vehicle seat described in the '770 Publication, a recliner arm (the upper arm) serving as a separate member is attached to the main side back side frame having a closed section structure so that this recliner arm and the reclining device are coupled to each other. Thus, there is a problem that, due to an attachment error between the members, a position precision of the reclining device and the shoulder anchor into which the shoulder belt portion is inserted may be decreased.

SUMMARY

An object of various embodiments of the present invention is to provide a seat belt-integrated vehicle seat without an attachment error in an attachment part of a reclining device so that rigidity of the seat frame is improved without losing in size precision of the entire seat frame.

According to a vehicle seat described herein, the above problem is solved by a vehicle seat with a seat belt including a seat back frame having at least a pair of side frames, and an upper frame for coupling a pair of the side frames on the upper side, a shoulder anchor portion provided in an upper part of one of the side frames, the shoulder anchor portion into which a shoulder belt portion of the seat belt is inserted, and a reclining device provided on the lower side of the one of the side frames, in which the one of the side frames has a closed section structure portion having a hollow closed section, and an extension portion integrally formed by downwardly extending a surface of the closed section structure portion positioned on the outer side, and the reclining device is attached to the extension portion.

In such a way, the side frame on the side where the shoulder anchor portion into which the shoulder belt portion is inserted is provided has the extension portion integrally formed by downwardly extending the surface of the closed section structure portion positioned on the outer side, and the reclining device is attached to the extension portion. That is, since the side frame is continuously formed between the shoulder anchor portion and the reclining device, an error due to a displacement of an attachment position of the reclining device is suppressed. Therefore, since a decrease in position precision (size precision) of the reclining device and the shoulder anchor portion is suppressed, rigidity of the side frame is improved.

In an embodiment, the closed section structure portion of the one of the side frames has a connection portion formed by bending one plate shaped member and connecting ends thereof, and the connection portion is arranged at a rear position that avoids the direction of a load received from the shoulder belt portion on a horizontal section of the closed section structure portion.

In such a way, by arranging the connection portion of the closed section structure portion at the rear position that avoids the direction of the load received from the shoulder belt portion, the strength is improved in order that unfolding of the side frame in the direction of the load from the shoulder belt portion is prevented when the side frame on the side where the shoulder anchor portion is provided receives a large load from the shoulder belt portion due to vehicle collision or the like. Since unfolding of the front side of the side frame is prevented, deformation of the extension portion is suppressed.

In an embodiment, the extension portion is formed into a flat plate, a reinforcing member having a U shape section is fixed on the inner side of the extension portion, and a part of the reinforcing member is superimposed and jointed to the closed section structure portion.

In such a way, by providing the reinforcing member, rigidity of the side frame is improved. Since the part of the reinforcing member and the closed section structure portion of the side frame are superimposed and jointed to each other, rigidity is further improved.

In an embodiment, one end of a coupling member for coupling the pair of the side frames may be coupled to the reinforcing member, and an opening portion may be provided on a surface between a lower end of the reinforcing member and a lower end of the extension portion.

In such a way, in the case where the opening portion is provided on the surface between the lower end of the reinforcing member and the lower end of the extension portion, the opening portion is positioned on the lower side of a coupling position of the one end of the coupling member and the reinforcing member. Thus, an attachment state of the coupling member is confirmed from the opening portion, and workability is improved.

In an embodiment, a front surface portion of the reinforcing member is formed up to the lower side of an attachment part of the reclining device.

In such a way, by enlarging the front surface portion of the reinforcing member, rigidity of the attachment part of the reclining device is improved.

In an embodiment, a spring hook member for locking a spring forming a part of the reclining device is attached onto an outer surface of the extension portion.

Since the extension portion is formed into a flat plate, flatness of the surface onto which the hook member is attached is easily ensured. In the case where the hook member is attached as in the above configuration, attachment precision is improved.

In an embodiment, a plurality of holes is formed on an outer surface of the side frame.

Since a plurality of the holes is formed on the outer surface onto which a smaller load compared to an inner surface is applied from the shoulder belt portion, a weight reduction is achieved while decrease in rigidity of the side frame is suppressed.

According to the above, the error due to the displacement of the attachment position of the reclining device is suppressed. Thus, since the decrease in the position precision (the size precision) of the reclining device and the shoulder anchor portion is suppressed, rigidity of the side frame is improved.

Also, the strength is improved so that unfolding of the side frame in the direction of the load from the shoulder belt portion is prevented. Since unfolding of the front side of the side frame is prevented, deformation of the extension portion is suppressed.

The rigidity of the side frame is improved, and the attachment state of the coupling member is confirmed from the opening portion. Thus, workability at the time of assembling is improved. The rigidity of the attachment part of the reclining device is improved, and the flatness of the surface of the extension portion to which the hook member is attached is easily ensured. Thus, the attachment precision of the hook member is improved. A weight reduction is achieved while a decrease in rigidity of the side frame is suppressed.

DESCRIPTION OF THE DRAWINGS

The invention is illustrated below according to various embodiments shown in the following drawings.

DETAILED DESCRIPTION

Hereinafter, one embodiment of the present invention will be described with reference to the drawings. It should be noted that members, arrangement, and the like described below do not limit the present invention but, as a matter of course, can be variously modified consistent with the gist of the invention.

Figure 1:
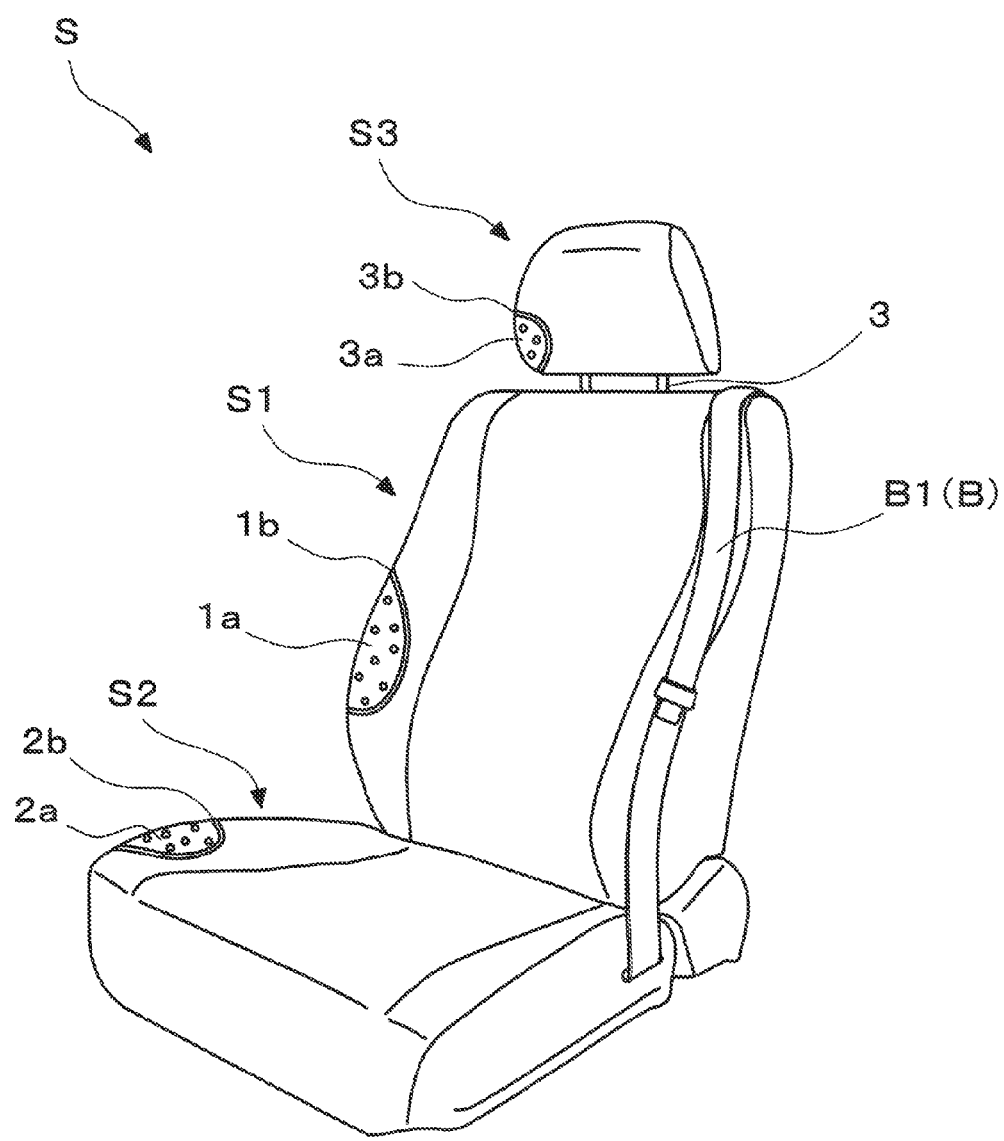
FIG. 1 is a schematic perspective view of a vehicle seat according to one embodiment of the present invention.

A vehicle seat S according to the present embodiment is formed by a seat back 51, a seating portion S2, and a headrest S3 as shown in FIG. 1. The seat back 51 and the seating portion S2 are formed by mounting cushion pads 1a, 2a on a seat frame F and covering the cushion pads with skin materials 1b, 2b. The headrest S3 is formed by arranging a pad material 3a in a core 3 (refer to FIG. 2) and covering the pad material with a skin material 3b. Although the core 3 of the present embodiment also plays a role of a headrest pillar supporting the headrest S3, the core and the headrest pillar may be formed as separate bodies.

The vehicle seat S of the present embodiment is a passenger seat, and the left side of the vehicle seat S (the right side in FIG. 1) indicates the vehicle body outer side (the vehicle door side), and the right side of the vehicle seat S (the left side in FIG. 1) indicates the vehicle body inner side (the vehicle body center side). The vehicle seat S is a seat belt-integrated vehicle seat to which a seat belt B is attached. A shoulder belt portion B1 of the seat belt B is attached on the vehicle body outer side in an upper part of the seat back 51.

Figure 2:
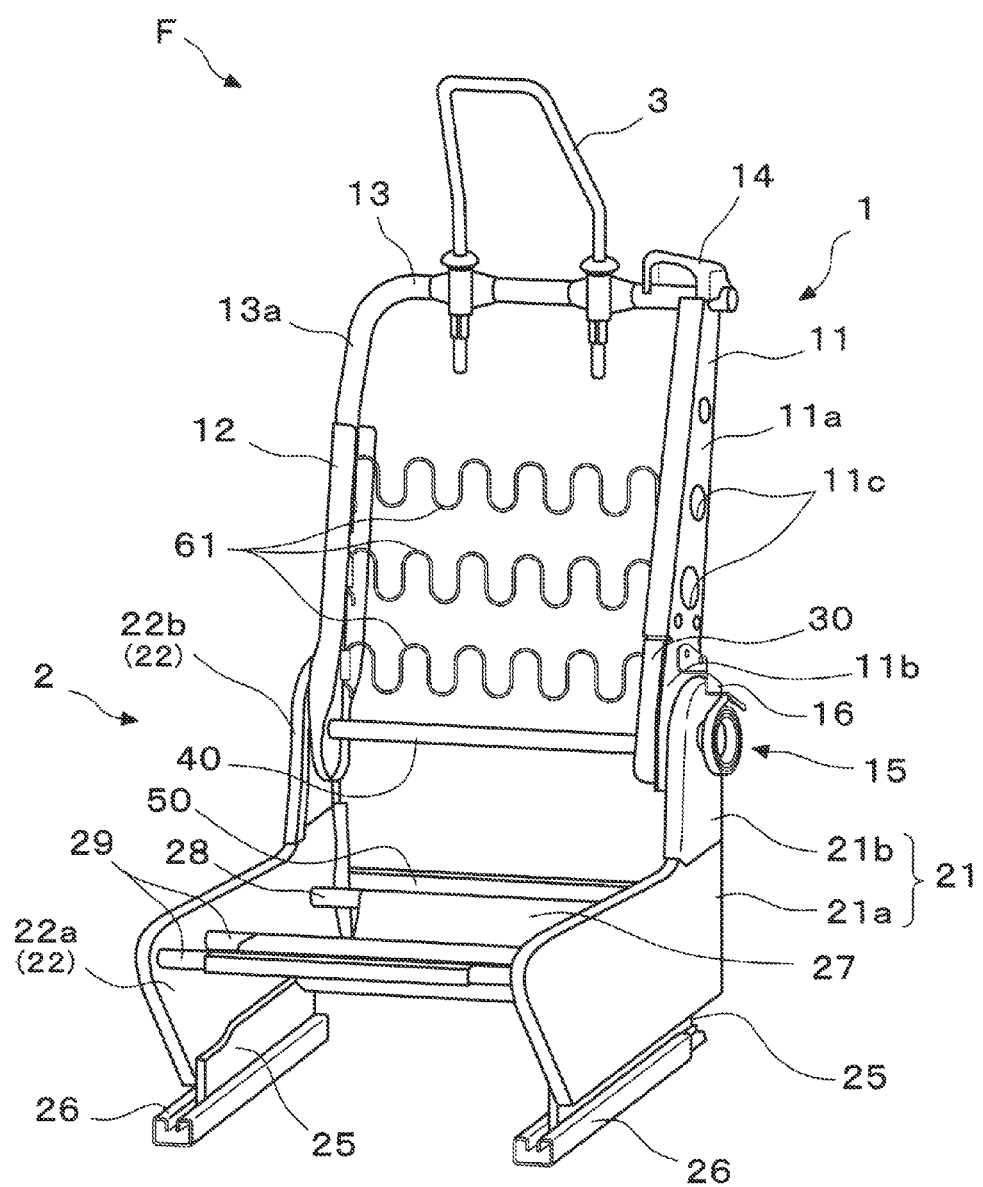
FIG. 2 is a schematic perspective view of a seat frame according to the embodiment of the present invention.
Figure 3:
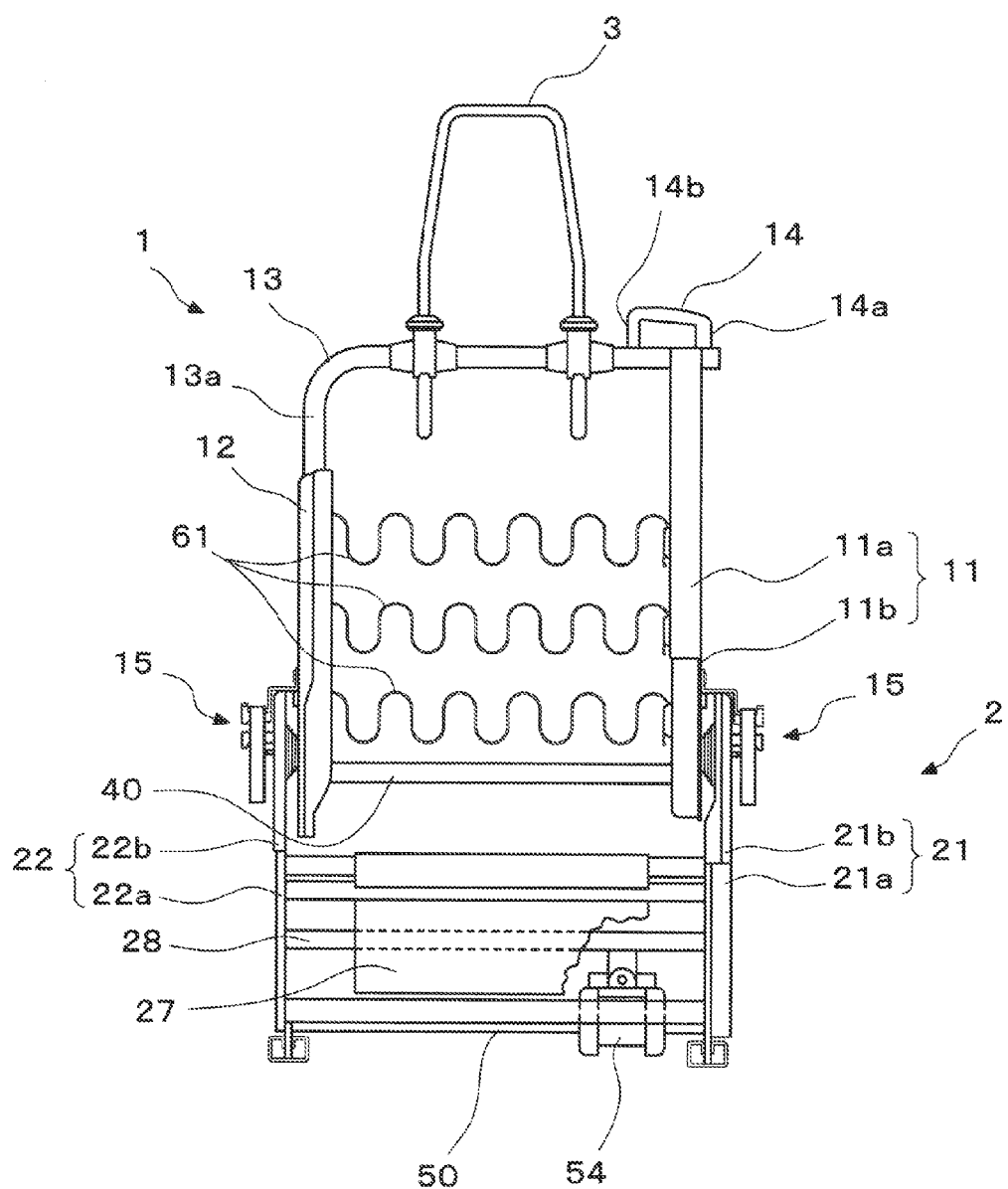
FIG. 3 is a schematic front view of the seat frame according to the embodiment of the present invention.
Figure 4:
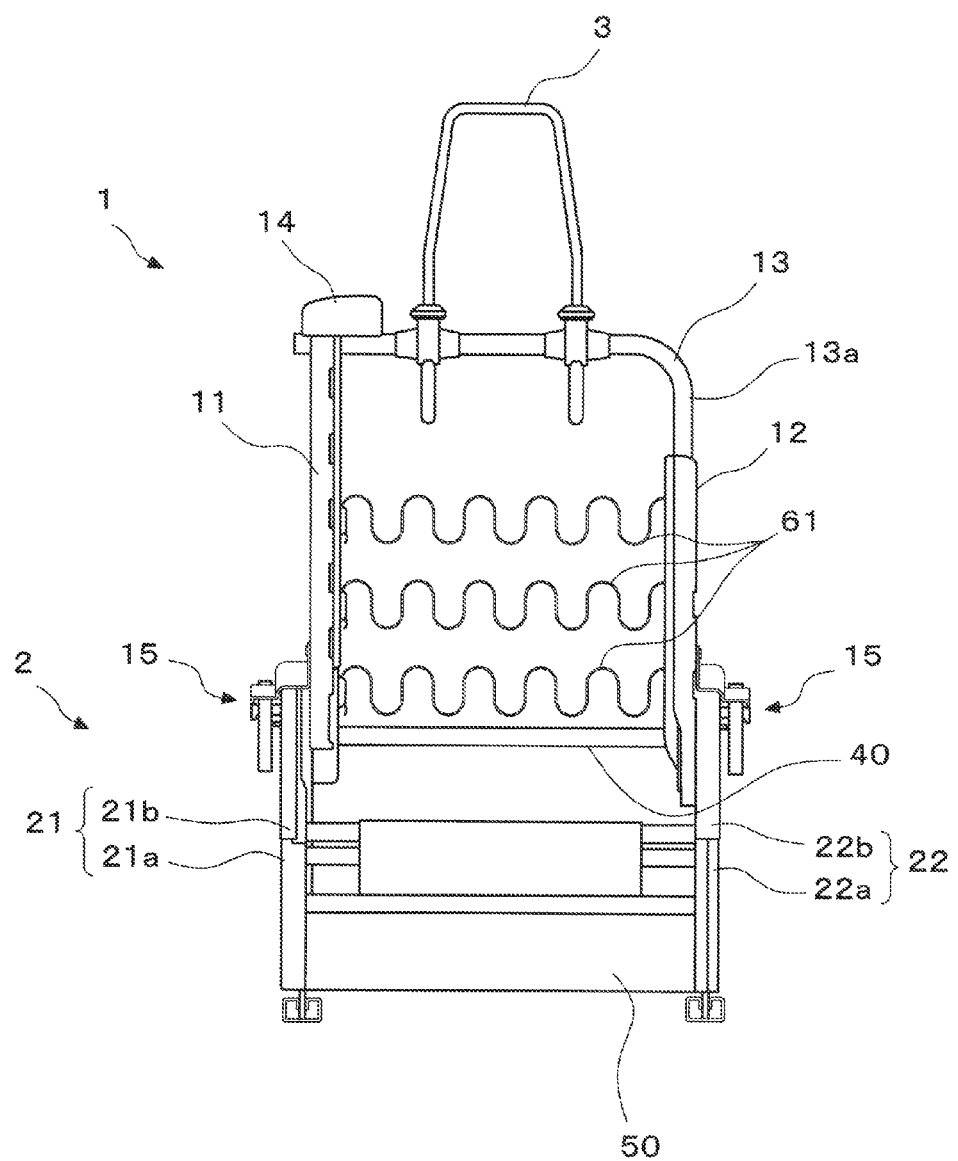
FIG. 4 is a schematic back view of the seat frame according to the embodiment of the present invention.

As shown in FIGS. 2 to 4, the seat frame F of the vehicle seat S is formed by a seat back frame 1 forming the seat back 51, and a seating frame 2 forming the seating portion S2. The seat back frame 1 and the seating frame 2 are rotatably coupled to each other via a reclining device 15.

The seat back S1 is formed by mounting the cushion pad 1a on the seat back frame 1 as described above and covering the cushion pad 1a with the skin material 1b, to support the back of a passenger from the rear side. In the present embodiment, the seat back frame 1 is formed into a rectangular frame body having both side portions and an upper portion coupled to the side portions, the portions being formed by metal plate materials or pipe materials.

In order to form a seat back width, the side portions are spaced from each other in the left and right direction, and have a pair of side frames 11, 12 extending in the up and down direction.

That is, the side frames 11, 12 forming part of the seat back frame 1 are formed to have predetermined length in the up and down direction, and arranged to face each other with a predetermined gap in the left and right direction. Bridging members 61 serving as posture holding portions supporting the cushion pad 1a from the rear side are arranged in an inner area of the seat back frame 1 in the seat back frame 1 (between both the side frames 11, 12).

Both ends of the bridging members 61 are axially supported by a side frame reinforcing member 30 or the side frame 11 and axial support portions provided in the side frame 12. Since the axial support portions are only required to rotatably axially support the bridging members 61, a known technology can be used. Instead of the axial support portions, holes may be formed in the side frame reinforcing member 30 or the side frame 11 and a side plate of the side frame 12, and the ends of the bridging members 61 may be rotatably inserted into and retained to the holes.

In the present embodiment, S springs formed by steel wire rods that are springy are used as the bridging members 61 arranged between the side frames 11, 12. The bridging members 61 are not limited to the S springs. Any members, such as a plate shaped member, may be arranged as long as the members are capable of supporting the passenger from the rear side. In addition, a mat function and a lumbar support function may be provided as a matter of course.

Among the side frames 11, 12 forming the side portions, the side frame 11 arranged on the vehicle body outer side (the vehicle door side) is formed by bending one metal plate material into a rectangular shape to have a closed section structure, that is, a section thereof is formed into a hollow rectangular shape (a closed section structure portion 11a). In a lower part of an outer surface (on the vehicle door side) of the closed section structure portion 11a of this side frame 11, an extension portion 11b formed by downwardly extending the flat plate material is formed integrally with the outer surface of the closed section structure portion 11a. That is, the plate material is punched out to form an extended part on one side of a center part of the plate material, and then sheet metal processing is performed so that the section is formed into a hollow rectangular shape. A plurality of holes 11c is formed on the outer surface of the closed section structure portion 11a.

The side frame 12 arranged on the vehicle body inner side (the vehicle body center side) is formed by bending both ends of one metal plate material in the vehicle front and rear direction toward the inner side of the seat frame F.

In such a way, the side frame 11 arranged on the vehicle body outer side has the closed section structure to have a higher strength than the side frame 12 provided on the vehicle body inner side. In the seat belt-integrated vehicle seat S, a large load from the passenger is applied onto the seat belt B due to vehicle collision or the like, and a large load is applied onto the side frame 11 on the vehicle body outer side to which the shoulder belt portion B1 is attached. Thus, in such a way, rigidity of the side frame 11 on the vehicle body outer side is increased.

Width in the front and rear direction of the side frame 11 is spread from the upper side toward the lower side, and a plurality of the holes 11c is formed on the outer surface of the closed section structure portion 11a. Among a plurality of the holes 11c, the holes formed on the lower side have larger areas than the holes on the upper side. A shape of the holes 11c is preferably formed into a round shape on which stress does not concentrate, so that the load is dispersed when the load is applied onto the side frame 11. In such a way, by providing a plurality of the holes 11c, weight is reduced while suppressing a decrease in rigidity of the side frame 11.

Figure 5:
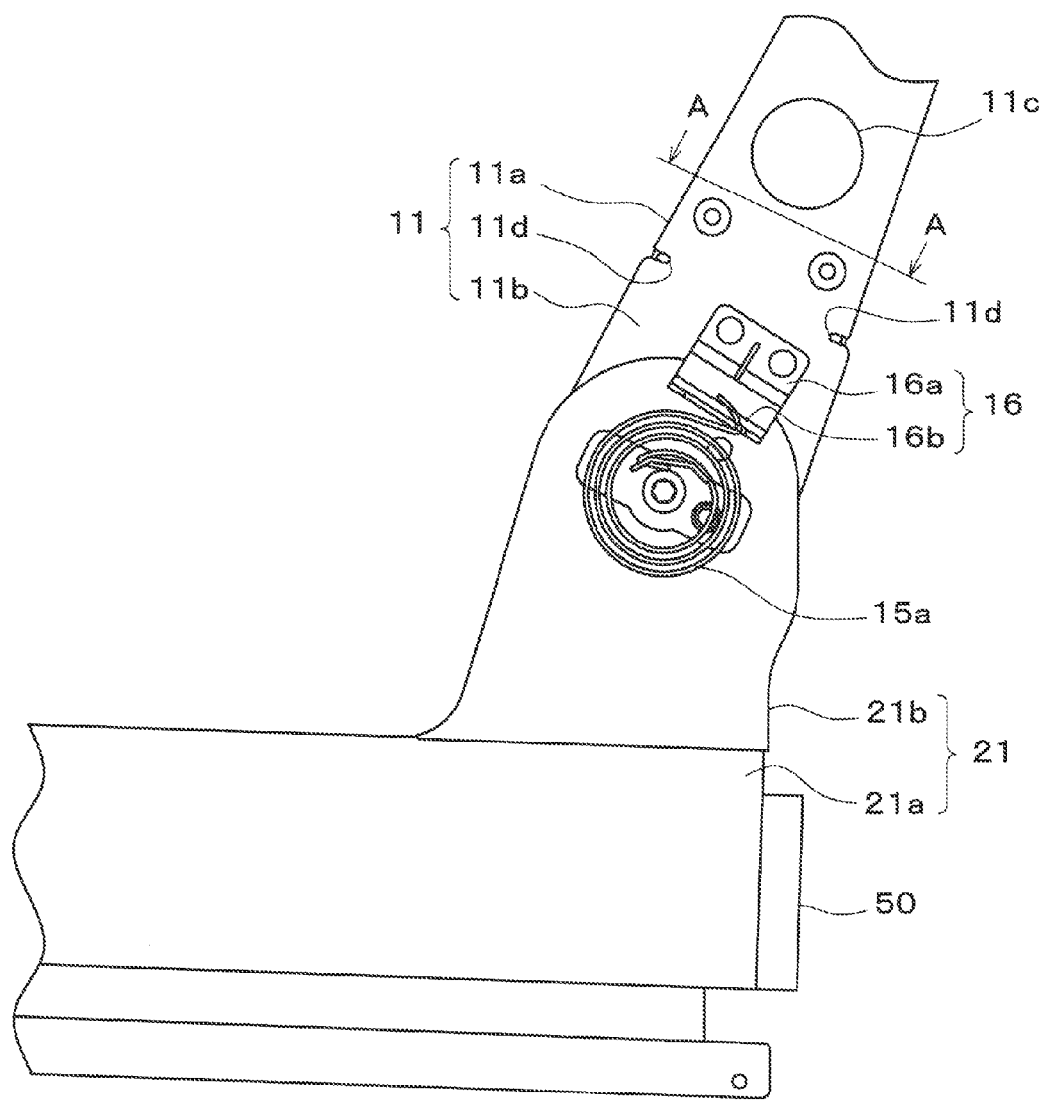
FIG. 5 is a partially enlarged view of a side frame according to the embodiment of the present invention.

FIG. 5 shows a side surface of the side frame 11 from the seat outer side direction. As shown in FIG. 5, between the closed section structure portion 11a and the extension portion 11b of the side frame 11, that is, on the both sides of an upper end of the extension portion 11b, cutout portions 11d are formed. By forming the cutout portions 11d, when one plate material is bent to form the closed section structure portion 11a, a bending processing can be performed without influencing a flat shape of the extension portion 11b so that flatness precision of the extension portion 11b is ensured.

Figure 6:
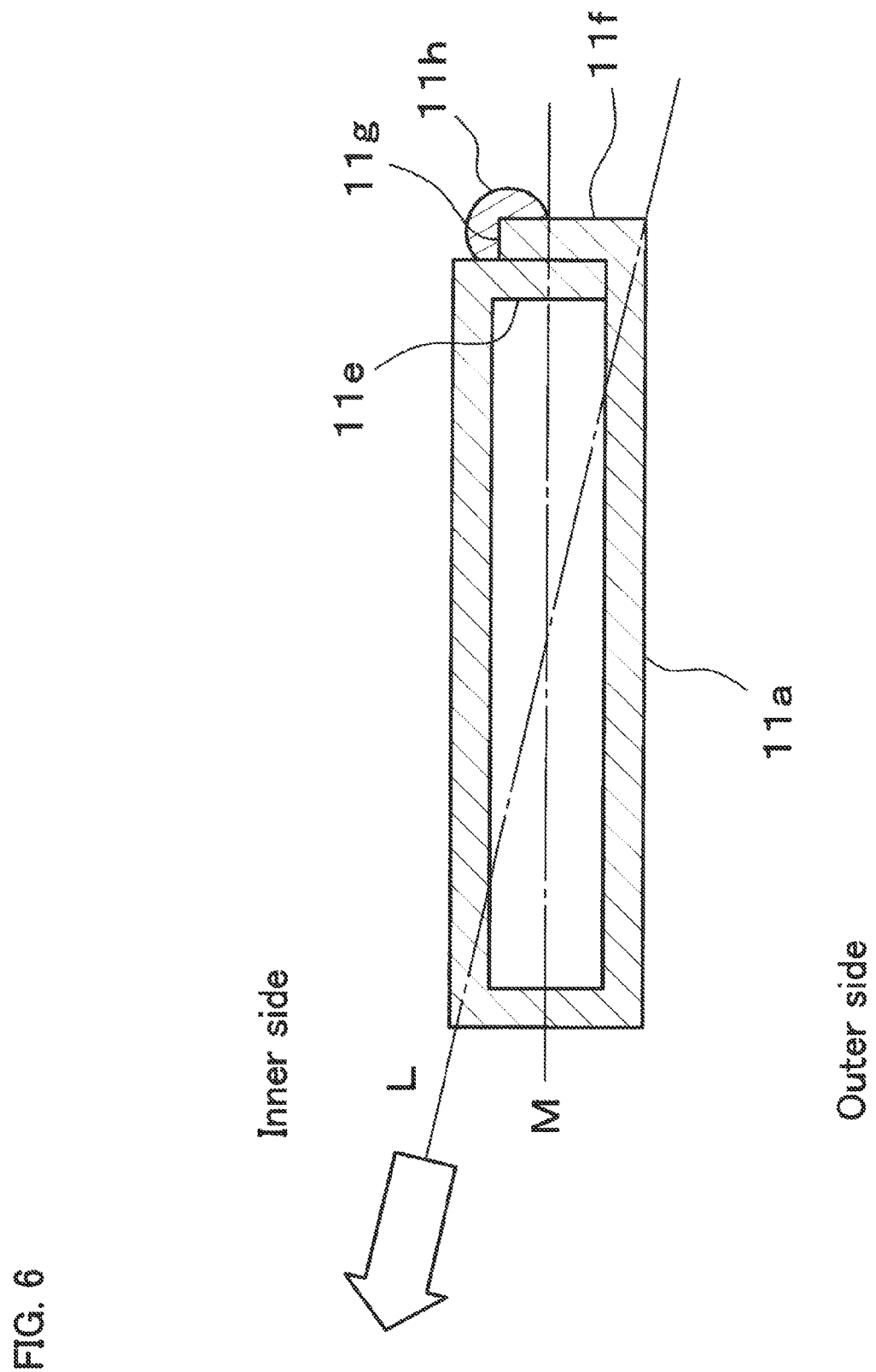
FIG. 6 is a sectional view by the line A-A of FIG. 5.

A configuration of the closed section structure portion 11a of the side frame 11 will be described with reference to FIG. 6. FIG. 6 is the sectional view by the line A-A of FIG. 5 showing the section of the closed section structure portion 11a. An arrow in FIG. 6 indicates the direction of the load when the load is applied from the shoulder belt portion B1 of the seat belt B, an imaginary line L indicates an extended line of the direction of the load, and an imaginary line M indicates a center line of width in the seat left and right direction of the closed section structure portion 11a. The closed section structure portion 11a is formed by bending one plate body, and superimposing and combining bent ends 11e, 11f at a rear position when the side frame 11 is assembled. A part where the bent ends 11e and 11f are superimposed and combined corresponds to a connection portion of various embodiments of the present invention. This connection portion is arranged at a position that avoids the direction of the load received from the shoulder belt portion B1, that is, the imaginary line L.

Further, in the superimposed part of the connection portion, the bent end 11e bent toward the vehicle body outer side is positioned on the inner side of the section, the bent end 11f bent toward the vehicle body inner side is positioned on the outer side of the section, and then the bent ends are superimposed. An end 11g of the bent end 11f positioned on the outer side of the section is arranged at a more distant position from the direction of the load received from the shoulder belt portion B1 (the imaginary line L). The end is also positioned on the seat inner side and on the rear side relative to the center line of the width in the seat left and right direction of the closed section structure portion 11a (the imaginary line M). The reference character 11h denotes a welding portion.

In such a way, by arranging the connection portion of the closed section structure portion 11a, in more detail, the end 11g of the bent end 11f positioned on the outer side of the section of the connection portion and the welding portion 11h thereof at the rear position that avoids the direction of the load received from the shoulder belt portion B1, the strength is improved so that the closed section structure portion 11a is not unfolded due to the load from the shoulder belt portion B1.

On the seat inner side of the extension portion 11b extending on the lower side of the closed section structure portion 11a of the side frame 11, that is, on the side where the passenger of the side frame 11 is seated, the side frame reinforcing member 30 is fixed. The side frame reinforcing member 30 is formed by bending one plate body to have a U shape section so that width in the left and right direction is slightly narrower than the width in the seat left and right direction of the closed section structure portion 11a, and that width in the front and rear direction is the same as width in the seat front and rear direction of the extension portion 11b.

Figure 7:
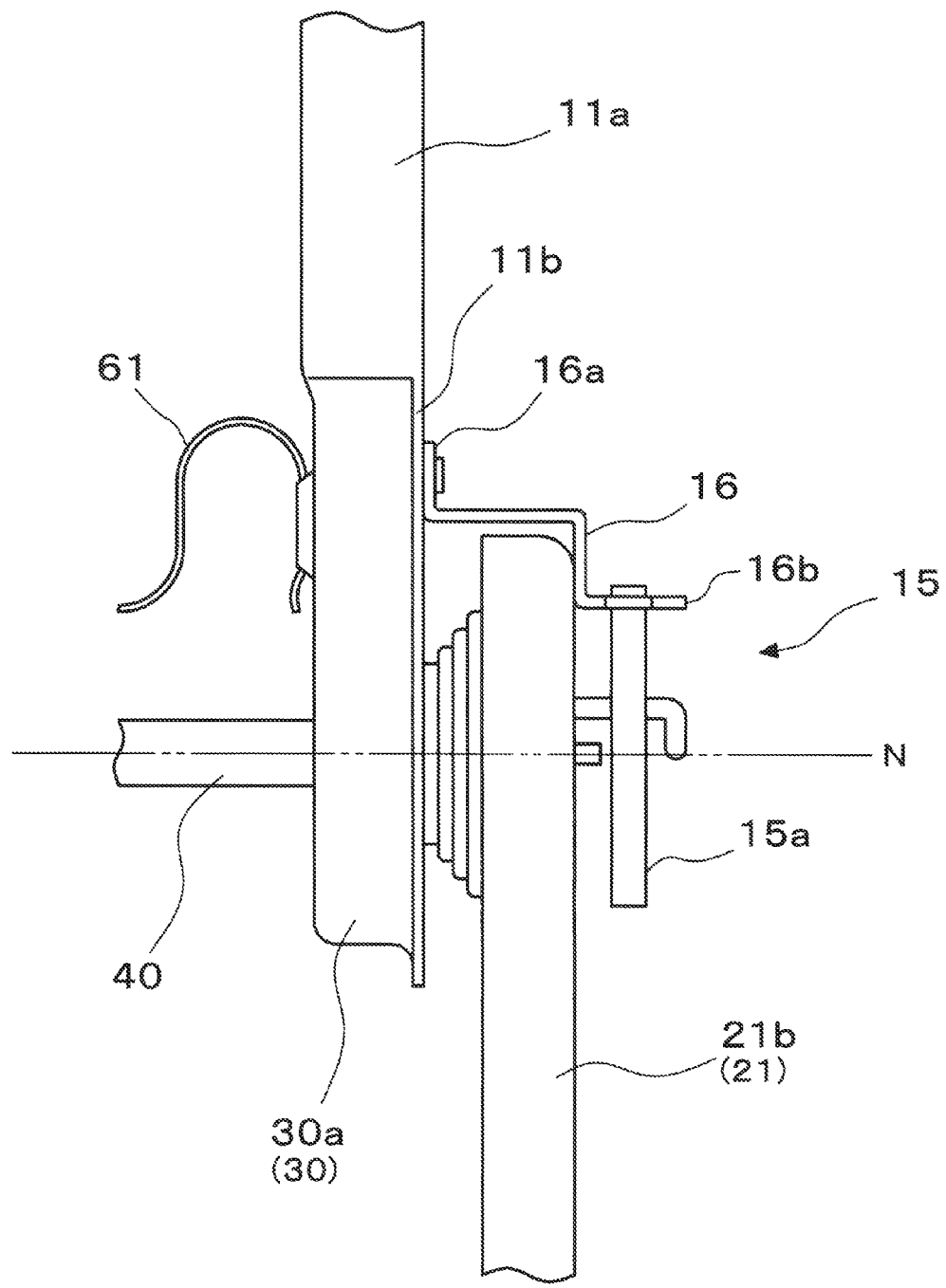
FIG. 7 is a partially enlarged view of a coupling part of the side frame and a seating side frame according to the embodiment of the present invention.
Figure 8:
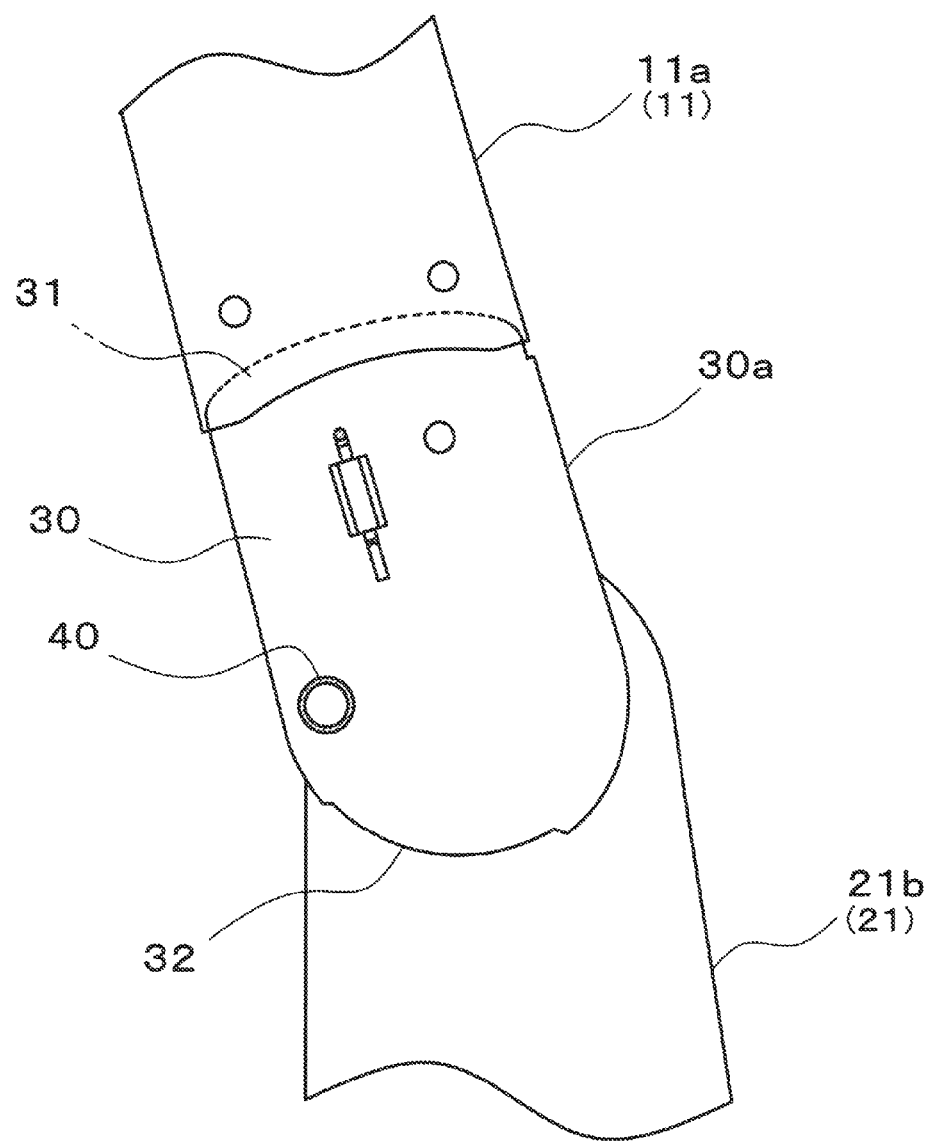
FIG. 8 is a partially enlarged view of the side frame and a reinforcing member according to the embodiment of the present invention.

As shown in FIGS. 7 and 8, the side frame reinforcing member 30 is jointed by welding or the like so that front and rear surfaces thereof are continuous to the extension portion 11b when the side frame reinforcing member is arranged on the seat inner side of the extension portion 11b. An upper part of a surface of the side frame reinforcing member 30 on the seat inner side is arranged to overlap a lower part of a surface of the closed section structure portion 11a of the side frame 11 on the seat inner side by predetermined width, and the upper part is jointed by the welding or the like to be continuous in this overlapping portion 31. In such a way, the side frame reinforcing member 30 is attached to be integrated with the side frame 11.

In such a way, the side frame 11 to which the shoulder belt portion B1 is attached has the closed section structure, the integrated extension portion 11b is provided, and the side frame reinforcing member 30 is fixed on the inner side thereof. Thus, rigidity of the side frame 11 is improved while suppressing a decrease in size precision of attachment positions of the reclining device 15 and the shoulder belt portion B1.

The overlapping portion 31 of the present embodiment is formed into a curved shape. In such a way, by forming the overlapping portion 31 into a curved shape, a fixing part for fixing the side frame reinforcing member 30 to the section structure portion 11a can be elongated, and the load is dispersed by the curved shape. Thus, rigidity is further increased.

A front surface portion 30a of the side frame reinforcing member 30 is formed up to the lower side of an attachment part of the reclining device 15, that is, center of the attachment position (an imaginary line N of FIG. 7). Since the extension portion 11b is formed by one plate material, deformation is easily generated due to the load in the oblique direction from the shoulder belt portion B1. However, when the front surface portion 30a of the side frame reinforcing member 30 is enlarged, rigidity of the attachment part of the reclining device 15 is improved.

Further, one end of a member pipe 40 serving as a coupling member described below for coupling the side frames 11, 12 is coupled to the side frame reinforcing member 30. An opening portion 32 is provided on the lower side of a coupling position of the one end of the member pipe 40 on a surface between a lower end of the side frame reinforcing member 30 and a lower end of the extension portion 11b, that is, on a surface continuously extending downwardly from the front surface portion 30a. By looking in from this opening portion 32, attachment of the member pipe 40 is easily confirmed.

A bracket 16 for supporting the side frame 11 and an upper seating side frame 21b of a seating side frame 21 described below is attached to an outer surface of the extension portion 11b of the side frame 11. As shown in FIGS. 5 and 7, the bracket 16 has a sectional shape formed by continuous double Ls. A flat attachment surface 16a abuts with the outer surface of the extension portion 11b and is fixed with fixing tools such as screws or by the welding or the like. A cutout (not shown) is provided in the front and rear direction in a locking portion 16b serving as a horizontal surface on the most outer side of the bracket 16. An outer peripheral end of a spiral spring 15a forming the reclining device 15 can be bent and locked onto this cutout. In such a way, the bracket 16 also has a function as a spring hook member for locking the spiral spring 15a. Due to a flat shape, the extension portion 11b is easily jointed to the attachment surface 16a of the bracket 16, so that attachment precision of the bracket 16 is ensured.

As shown in FIGS. 2 to 4, an upper frame 13 is formed by bending a pipe material, and a side surface portion 13a of the upper frame 13 is arranged to partially overlap the side plate of the side frame 12, and jointed to the side frame 12 in this overlapping part by the welding or the like. The other end of the upper frame 13 is jointed to a concave portion formed in an upper end of the side frame 11.

The headrest S3 is arranged on the upper side of the upper frame 13 forming the upper portion. The headrest S3 is formed by providing the pad material 3a in an outer peripheral part of the core 3 as described above and covering an outer periphery of the pad material 3a with the skin material 3b. Guide locks are attached on the lower side of the core 3 (a part corresponding to the headrest pillar) attached to the upper frame 13, so that a height position can be adjusted.

On the upper frame 13, on the side of the side frame 11 which is reinforced, a shoulder anchor portion 14 into which the shoulder belt portion B1 of the seat belt B is inserted is fixed and jointed. The shoulder anchor portion 14 is a box shape member surrounded by a front side surface, both left and right side surfaces, an upper surface, and a back side surface. The front side surface has an inverted U shape seen from the front side in which a space is formed in a center part. Lower ends of both the left and right side surfaces of the shoulder anchor portion 14 are jointed to the upper frame 13 by the welding or the like, and a space is formed between the upper frame 13 and the back side surface of the shoulder anchor portion 14. The shoulder belt portion B1 is inserted from the lower side of the space between the upper frame 13 and the shoulder anchor portion 14, and further inserted and attached to the front side through the space in the center part of the front side surface.

The shoulder anchor portion 14 is arranged at the same position as the side frame 11 positioned on the vehicle body outer side (the vehicle body door side) or on the outer side of the side frame 11. As shown in FIG. 3, the shoulder anchor portion 14 is attached at a position where an outer side surface portion 14a positioned on the seat outer side corresponds to the outer surface of the closed section structure portion 11a of the side frame 11, that is, at a position where the outer side surface portion is on the same plane as the outer surface of the closed section structure portion 11a, or on the outer side of the outer surface of the closed section structure portion 11a. An inner side surface portion 14b positioned on the seat inner side is attached on the inner side of the inner surface of the closed section structure portion 11a of the side frame 11. Since the shoulder anchor portion 14 is arranged at such a position, the load applied from the shoulder belt portion B1 is easily dispersed toward both the sides of the side frame 11 and the upper frame 13 so that the load is received by the entire seat frame F. Therefore, there is no need for excessively increasing the strength of the side frame 11 so that the weight is reduced.

In a lower part (on the side of the seating frame 2) of the seat back frame 1, the side frames 11, 12 are coupled to each other by the member pipe 40 serving as the coupling member. The member pipe 40 is arranged along the rotating shaft direction of the reclining device 15 in the left and right direction. One end thereof is jointed to the side frame reinforcing member 30 integrally fixed to the side frame 11 on the lower side of the side frame 11 and coupled to the side frame 11 via this side frame reinforcing member 30, and the other end is jointed to a lower part of the side frame 12 by the welding or the like.

The seating portion S2 is formed by mounting the cushion pad 2a on the seating frame 2 as described above and covering the cushion pad 2a with the skin material 2b to support the haunches of the passenger from the lower side. In the present embodiment, the seating frame 2 has seating side frames 21, 22, a seating rear frame 28, and a seating front frame 29 as shown in FIG. 2.

The seating side frame 21 is formed by a lower seating side frame 21a, and the upper seating side frame 21b. The seating side frame 22 is formed by a lower seating side frame 22a, and an upper seating side frame 22b. The upper seating side frames 21b, 22b are respectively rotatably coupled to the extension portion 11b of the side frame 11 and the side frame 12 via the reclining device 15.

The upper seating side frames 21b, 22b are respectively formed to be continuous to the lower seating side frames 21a, 22a in coupling parts to the lower seating side frames 21a, 22a, and attached to cover upper ends of the lower seating side frames 21a, 22a.

In order to form a seating width, the lower seating side frames 21a, 22a are arranged to be spaced from each other in the left and right direction and to extend in the front and rear direction. As shown in FIG. 4, both ends of a retractor attachment bracket 50 formed by a plate material for coupling rear parts of the lower seating side frames 21a, 22a are respectively jointed to the lower seating side frames 21a, 22a.

The lower seating side frames 21a, 22a are formed by metal plate materials, and formed so that the rear parts thereof extend toward the upper side, that is, toward the seat back frame 1. The lower seating side frames 21a, 22a are jointed to the upper seating side frames 21b, 22b described above, and further, the upper seating side frames 21b, 22b are respectively jointed to the side frames 11, 12, so that the seat frame F is formed.

The lower seating side frames 21a, 22a are respectively supported on the lower side, and upper rails 25, 25 are attached to the lower seating side frames 21a, 22a. The upper rails 25, 25 are assembled to be a sliding type in which a position is adjustable in the front and rear direction with lower rails 26, 26 installed in a vehicle floor.

As shown in FIGS. 3 and 4, a retractor 54 serving as a seat device portion is jointed onto a front surface of the retractor attachment bracket 50. The retractor 54 is formed so that the seat belt B is pulled out and wound again, and attached on the side of the front surface of the retractor attachment bracket 50 in the vicinity of the side of the side frame 11 at a position where the retractor is not in contact with the seating rear frame 28 described below in the present embodiment provided with the three-point seat belt. FIG. 3 shows a state that a cushion support member 27 is partially cut out in order to show the retractor 54.

The pipe shape seating rear frame 28 is attached on the front side of the retractor attachment bracket 50, and the seating front frame 29 is attached on the further front side, so that the lower seating side frames 21a, 22a are coupled. The retractor attachment bracket 50, the seating rear frame 28, and the seating front frame 29 are formed by metal plate materials and pipe materials, and ends thereof are respectively fixed and jointed to the lower seating side frames 21a, 22a by the welding or the like.

In an inner area of the seating frame 2 in the seating frame 2 (between both the seating side frames 21, 22), the cushion support member 27 supporting the cushion pad 2a from the lower side is arranged. The cushion support member 27 is formed by a rectangular plate material, and fixed by respectively hanging a pair of front and rear sides facing each other onto the seating rear frame 28 and the seating front frame 29.

This cushion support member 27 is formed by a metal plate material, and smooth projections and recesses are formed on this plate material. Although the example that the plate material is arranged as the cushion support member 27 is shown in the present embodiment, a shape and a material are not limited to this as long as the cushion support member is capable of supporting the passenger and the cushion pad 2a from the lower side.

Figure 9:
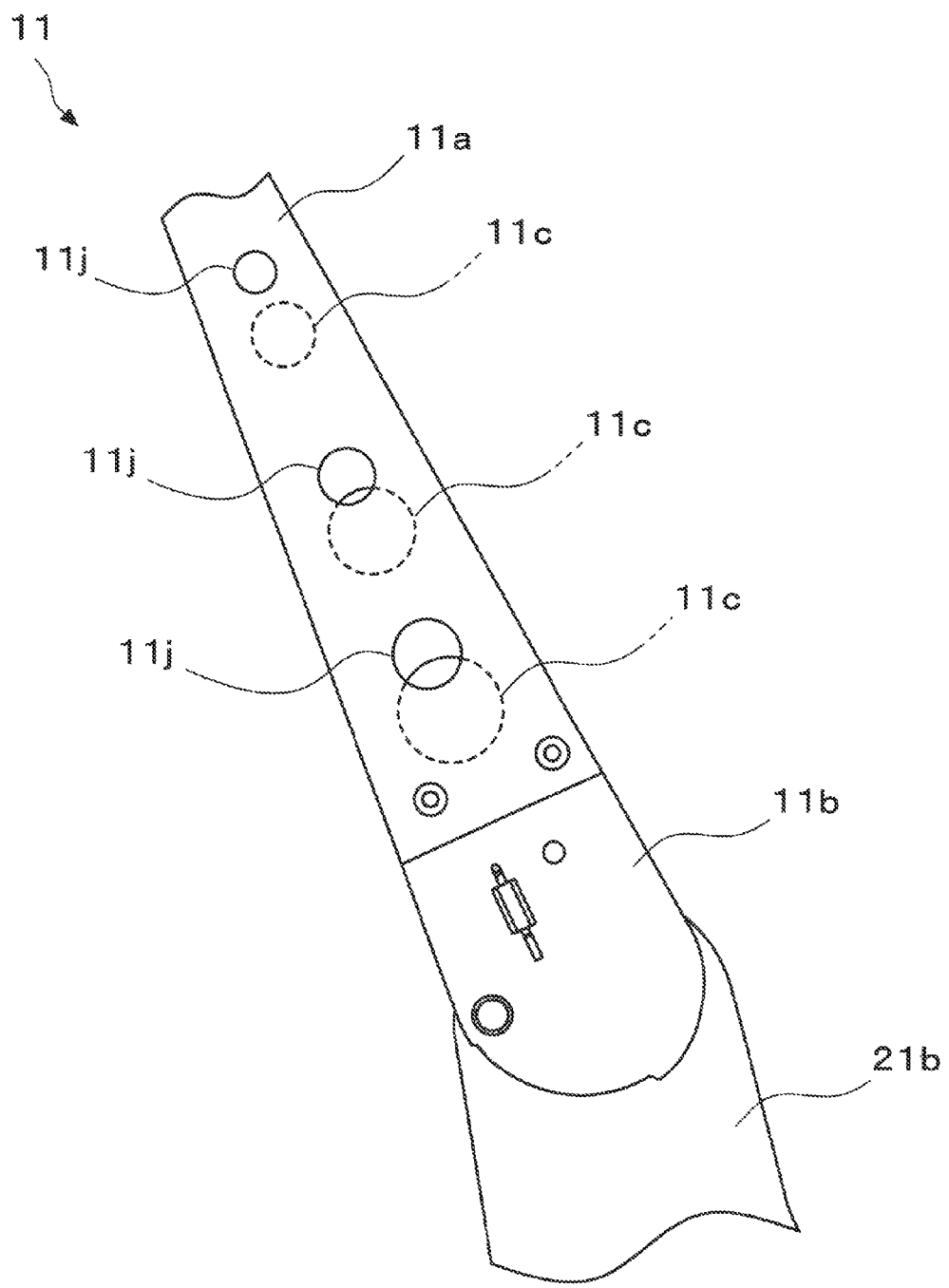
FIG. 9 is a partially enlarged view of a modified example of the side frame according to the embodiment of the present invention.
Figure 10:
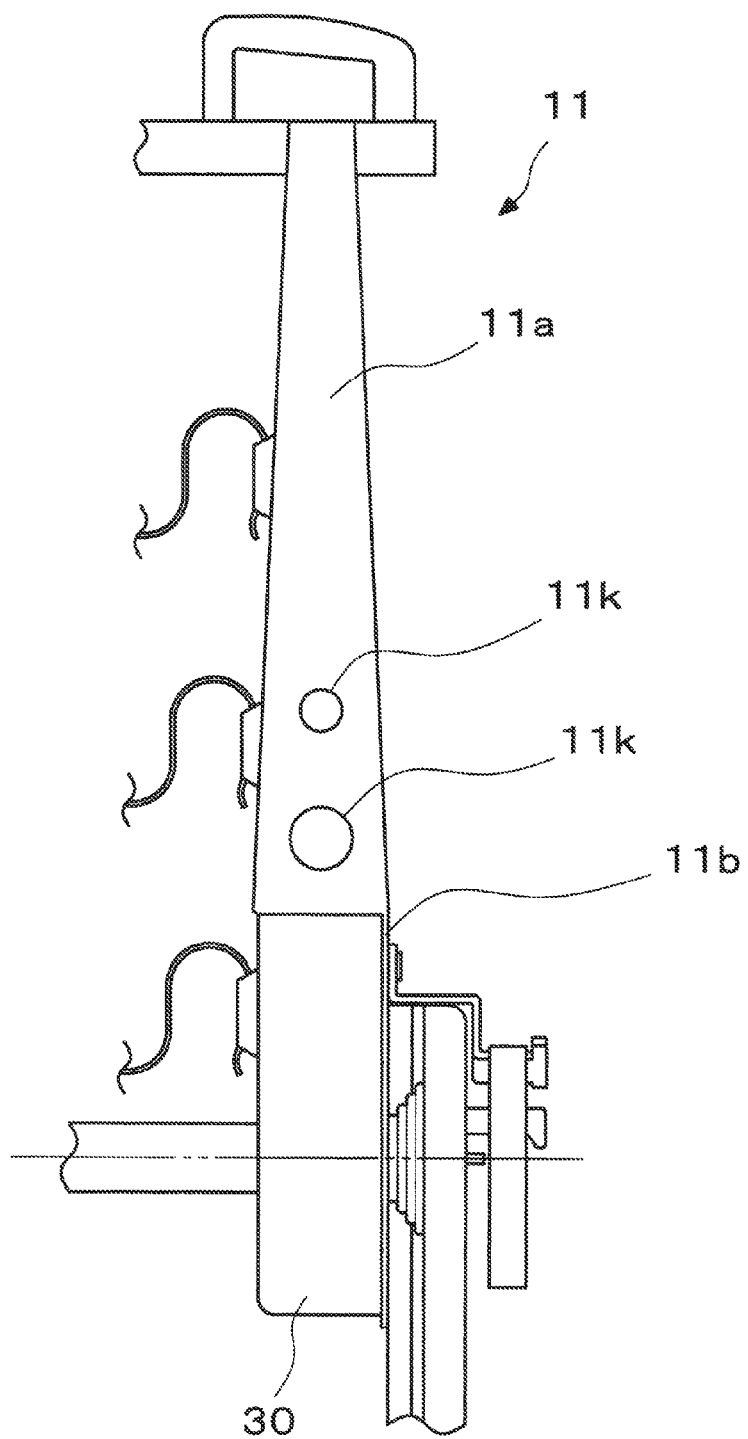
FIG. 10 is a partially enlarged view of another modified example of the side frame according to the embodiment of the present invention.

Next, modified examples of the side frame 11 will be shown with reference to FIGS. 9 and 10.

FIG. 9 is a partial side view in which the side frame 11 is seen from the seat inner side. In the example shown in FIG. 9, a plurality of holes 11j is also formed on the seat inner surface of the closed section structure portion 11a having a closed section of the side frame 11. Areas of the holes 11j formed on this inner surface are respectively formed to be smaller than the areas of the holes 11c respectively formed in the vicinity of positions facing the holes 11j, on the seat outer surface of the closed section structure portion 11a. In such a way, by providing the holes 11j having the smaller areas on the inner surface, the weight is reduced while suppressing a decrease in rigidity on the inner surface side of the side frame 11 onto which the large belt load is imposed.

Further, in the example shown in FIG. 9, the holes 11c, 11j are formed so that center points of the holes 11j formed on the inner surface are displaced from center points of the holes 11c formed on the outer surface. By forming the holes with displaced center points in such a way, the weight is reduced while further suppressing a decrease in rigidity on the inner surface side of the side frame 11 onto which the large load is imposed.

FIG. 10 is a partial front view of the side frame 11. In the example shown in FIG. 10, the closed section structure portion 11a of the side frame 11 is formed into a shape in which width in the left and right direction is spread in a lower part more than an upper part. Therefore, rigidity of the lower part of the side frame 11 in which the large belt load is generated is improved. Since the width in the left and right direction is spread gradually from the upper part toward the lower part, rigidity of the side frame 11 is furthermore improved and the weight is reduced.

In the example shown in FIG. 10, the width in the left and right direction of the closed section structure portion 11a is spread gradually from the upper part toward the lower part. However, the width in the left and right direction may be continuously spread up to the lower end of the side frame reinforcing member 30. Although both left and right parts (on the seat outer side and inner side) of the closed section structure portion 11a are similarly spread toward the lower part, only one of the left and right parts may be spread toward the lower part.

Further, in the example shown in FIG. 10, holes 11k are formed in lower parts on front and rear surfaces of the closed section structure portion 11a of the side frame 11 (the holes on the rear surface are not shown). In such a way, by providing the holes 11k in the lower part having the large width in the left and right direction, weight is furthermore reduced. By increasing areas of the holes formed on the rear surface (not shown) more than the holes 11k formed on the front surface, the weight is reduced while suppressing a decrease in rigidity on the front surface side of the side frame 11 onto which the large belt load is imposed.

It is more favorable when the side frame 11 in the example of FIG. 9 is further provided with the characteristics of the side frame 11 in the example of FIG. 10. That is, by providing the holes having the small areas on the inner surface of the side frame 11, further spreading the width in the left and right direction in the lower part of the side frame 11, and providing the holes in the lower parts of the front and rear surfaces, the weight is reduced while furthermore improving rigidity of the side frame 11.

As described above, in the vehicle seat S of the present embodiment, the side frame 11 to which the shoulder belt portion B1 is attached has the closed section structure, the integrated extension portion 11b is provided by extending the outer surface of the side frame 11, and the side frame reinforcing member 30 is fixed on the inner side thereof. Thus, rigidity of the side frame 11 is improved while suppressing the decrease in the size precision of the attachment positions of the reclining device 15 and the shoulder belt portion B1.

Further, since the side frame 11 is formed to have the characteristics described above, the weight is reduced while improving rigidity relative to the direction of the load applied from the shoulder belt portion B1.

Although the vehicle seat used on the passenger seat side of a front seat of a motor vehicle is described in the above embodiment as a specific example, the present invention is not limited to this. The same configuration can also be applied to a vehicle seat on the driver seat side and a vehicle seat of a rear seat as a matter of course.

All references, including publications, patent applications, and patents, cited herein are hereby incorporated by reference to the same extent as if each reference were individually and specifically indicated as incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of components that perform the specified functions.

The particular implementations shown and described herein are illustrative examples of the invention and are not intended to otherwise limit the scope of the invention in any way. For the sake of brevity, conventional aspects of the systems (and components of the individual operating components of the systems) may not be described in detail. Furthermore, the connecting lines, or connectors shown in the various figures presented are intended to represent exemplary functional relationships and/or physical or logical couplings between the various elements. Many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

The words "mechanism" and "element" are used herein generally and are not limited solely to mechanical embodiments. Numerous modifications and adaptations will be readily apparent to those skilled in this art without departing from the spirit and scope of the present invention.

TABLE OF REFERENCE CHARACTERS

S Vehicle seat
S1 Seat back
S2 Seating portion
S3 Headrest
B Seat belt
B1 Shoulder belt portion
F Seat frame
1 Seat back frame
2 Seating frame
3 Core
1a, 2a, Cushion pad (pad material)
3a
1b, 2b, Skin material
3b
11, 12 Side frame
11a Closed section structure portion
11b Extension portion
11c, 11j, Hole
11k
11d Cutout portion
11e, 11f Bent end
11g End
11h Welding portion
13 Upper frame
13a Side surface portion
14 Shoulder anchor portion
14a Outer side surface portion
14b Inner side surface portion
15 Reclining device
15a Spiral spring
16 Bracket (spring hook member)
16a Attachment portion
16b Locking portion
21, 22 Seating side frame
21a, 22a Lower seating side frame
21b, 22b Upper seating side frame
25 Upper rail
26 Lower rail
27 Cushion support member
28 Seating rear frame
29 Seating front frame
30 Side frame reinforcing member
30a Front surface portion
31 Overlapping portion
32 Opening portion
40 Member pipe (coupling member)
44 Energy absorption member
50 Retractor attachment bracket
54 Retractor (seat device portion)
61 Bridging member

What is claimed is:

1. A vehicle seat with a seat belt, comprising:
a seat back frame having at least a pair of side frames, and an upper frame for coupling the pair of the side frames on an upper side;
a shoulder anchor portion provided in an upper part of one of the side frames, the shoulder anchor portion into which a shoulder belt portion of the seat belt is inserted; and
a reclining device provided on a lower side of the one of the side frames;
wherein:
the one of the side frames has a closed section structure portion having a hollow closed section, and an extension portion integrally formed by downwardly extending a surface of the closed section structure portion positioned on an outer side of the seat;
the reclining device is attached to the extension portion;
the extension portion is formed into a flat plate;
a lower end of the extension portion extends below a lower end of the closed section structure portion;
the closed section structure portion is provided with an opening at the lower end; and
a reinforcing member having a U shape section is fixed on an inner side surface of the extension portion and to the opening of the closed section structure portion.

2. The vehicle seat according to claim 1, wherein:
the closed section structure portion of the one of the side frames has a connection portion formed by bending one plate shaped member and connecting ends thereof; and the connection portion is arranged at a rear position that avoids a direction of a load received from the shoulder belt portion on a horizontal section of the closed section structure portion.

3. The vehicle seat according to claim 2, wherein:
at least a part of the connection portion overlaps with a corner portion of the U shape of the reinforcing member.

4. The vehicle seat according to claim 1, wherein:
a part of the reinforcing member is superimposed and jointed to the closed section structure portion.

5. The vehicle seat according to claim 1, wherein:
one end of a coupling member for coupling the pair of the side frames is coupled to the reinforcing member; and
an opening portion is provided on a surface between a lower end of the reinforcing member and a lower end of the extension portion.

6. The vehicle seat according to claim 1, wherein:
a front surface portion of the reinforcing member is formed up to a lower side of an attachment part of the reclining device.

7. The vehicle seat according to claim 1, further comprising:
a spring hook member for locking a spring forming a part of the reclining device that is attached onto an outer surface of the extension portion.

8. The vehicle seat according to claim 1, further comprising:
a plurality of holes formed on an outer surface of the side frame.

9. The vehicle seat according to claim 1, wherein:
a part of the reinforcing member is superimposed and jointed to the closed section structure portion; and
a joint portion of the reinforcing member and the closed section structure portion is formed into a curved shape.

10. The vehicle seat according to claim 1, wherein:
the reinforcing member contacts the extension portion in only a single plane.

* * * * *